(12) United States Patent
Suginaga

(10) Patent No.: US 6,631,244 B2
(45) Date of Patent: Oct. 7, 2003

(54) FILM CARRIER AND FILM HANDLING DEVICE USING SAME

(75) Inventor: Osami Suginaga, Sakai (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/848,469

(22) Filed: May 3, 2001

(65) Prior Publication Data

US 2001/0046040 A1 Nov. 29, 2001

(30) Foreign Application Priority Data

May 10, 2000 (JP) .................................. 2000-137000

(51) Int. Cl.[7] .................. G03B 17/24; G03B 17/26; G03B 27/52; G03B 27/58; H04N 1/146

(52) U.S. Cl. .................. 396/311; 396/512; 355/40; 355/74; 355/75; 358/506

(58) Field of Search .................. 355/75, 41, 40, 355/72, 74; 358/506; 396/512, 311

(56) References Cited

U.S. PATENT DOCUMENTS

| | | | | |
|---|---|---|---|---|
| 4,992,812 A | * | 2/1991 | Smart | 396/440 |
| 5,444,514 A | * | 8/1995 | Negoro et al. | 355/74 |
| 5,870,173 A | * | 2/1999 | Oberhardt et al. | 355/27 |

FOREIGN PATENT DOCUMENTS

| | | |
|---|---|---|
| JP | 07-181600 A | 7/1995 |
| JP | 08-029880 A | 2/1996 |
| JP | 08-179441 A | 7/1996 |
| JP | 11-142983 A | 5/1999 |

* cited by examiner

Primary Examiner—Russell Adams
Assistant Examiner—Rochelle Blackman
(74) Attorney, Agent, or Firm—Sidley Austin Brown & Wood LLP

(57) ABSTRACT

A film handling apparatus having a carrier, wherein the carrier is provided with a film size sensor disposed near a film entrance opening, a transport path capable of changing a transport width while maintaining a constant center position, a mask provided with opening opposite a film and designed for use with various sizes of film and a controller for changing the transport path width and selecting the mask opening in accordance with the film size detected by the film size sensor.

8 Claims, 5 Drawing Sheets

FILM CARRIER AND FILM HANDLING DEVICE USING SAME

This application is based on Patent Application No. 2000-137000 filed in Japan, the content of which is hereby incorporated by reference.

BACKGROUND OF THE INVENTION

1. Field of the Invention

The present invention relates to a film handling device such as a film scanner used in mini labs and the like. More specifically, the present invention relates to a general-purpose film negative carrier for various sizes of film, and a film handling device provided with this film carrier.

2. Description of the Related Art

FIG. 1 is a brief perspective view of a film scanner 1 used in a mini lab, and FIG. 2 is a perspective view of film negative carrier 25 used in the film scanner 1 of FIG. 1.

Light from an illumination lamp 21 passes through an optical path within an illumination unit 20, through an opening 26 formed in the top surface of the film negative carrier 25, and passes through the film 27. An opening (not illustrated) is formed in the in the top surface of the device body 30, such that the light passing through the film 27 also passes through the opening and enters the device body 30. A linear CCD (not illustrated) is fixedly mounted within the device body 30, such that the image recorded on the film 27 is captured by the formation of the image on the linear CCD.

The scanning method used for image capture may be a mirror scanning method wherein the film is fixed and a reflective mirror is moved, or a film scanning method wherein the mirror is fixed and the film is moved.

In the example of the conventional art shown in the drawing, the negative carrier 25 is used specifically for a particular size film such as, for example, 135 mm film, 240 mm film and the like, and the film transport width of the negative carrier 25 cannot be changed. Accordingly, when scanning a film of a different size, the negative carrier must be replaced by another negative carrier. Since this replacement operation is complex, and requires many negative carriers, the system itself becomes disadvantageously expensive.

SUMMARY OF THE INVENTION

The present invention provides a film handling device capable of capturing image data of film of a plurality of sizes without carrier replacement.

The carrier of the present invention is provided with a film size sensor disposed near the film entrance opening; a transport path capable of changing the transport width while maintaining a constant center position; a mask provided with opening opposite the film and designed for use with various sizes of film; and a controller for changing the transport path width and selecting the mask opening in accordance with the film size detected by the film size sensor.

The carrier of this construction can be used for general purpose with films of a plurality of sizes since the transport path width and mask opening are selected in accordance with the film size detected by the film size sensor. Since the width of the transport path is modified while maintaining a constant center position, enlargement of the device can be prevented as much as possible.

The specific structure of the transport path desirably provides two guide bars positioned in parallel. In this instance, each guide bar is arranged in contact with a force applying means relative to a cam positioned on the outside of the transport path and connected by a link mechanism at equal spacing. In the transport path the width of the transport path is controllable by controlling the cam rotation position.

In the carrier of the present invention the exit opening of the light transmitted through the carrier has a multilateral shape to include all openings having a mask.

The present invention provides a film scanner integratedly provided with the aforesaid carrier.

This film scanner can capture general-purpose image data on film of a plurality of sizes without exchanging the carrier. Furthermore, since a plurality of carriers for film of a plurality of sizes are not required, the total cost of the device can be reduced, and the complexity and space requirements for storage of the multiple carriers can be eliminated.

These and other objects, advantages and features of the invention will become apparent from the following description thereof taken in conjunction with the accompanying drawings which illustrate specific embodiments of the invention.

BRIEF DESCRIPTION OF THE DRAWINGS

In the following description, like parts are designated by like reference numbers throughout the several drawings.

DESCRIPTION OF THE PREFERRED EMBODIMENTS

Figure 1:
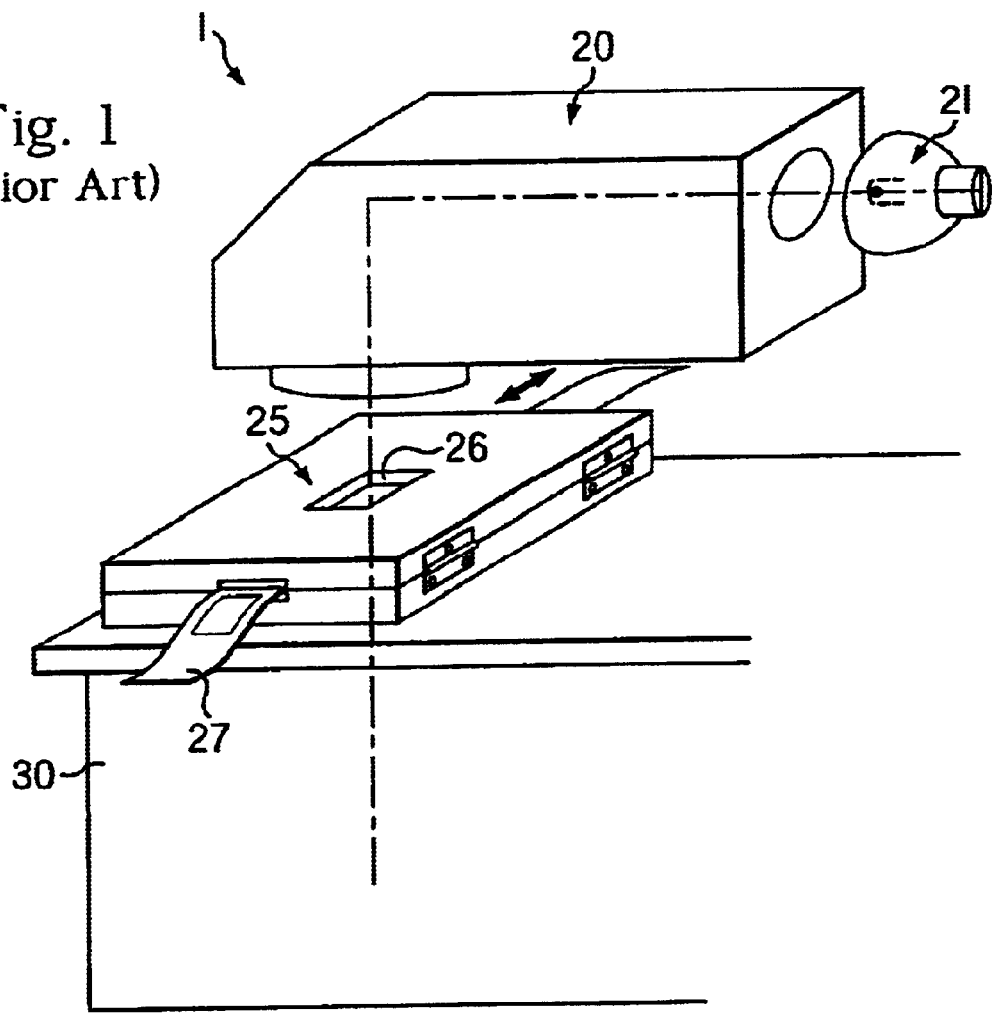
FIG. 1 is a brief perspective view of a conventional film scanner.
Figure 2:
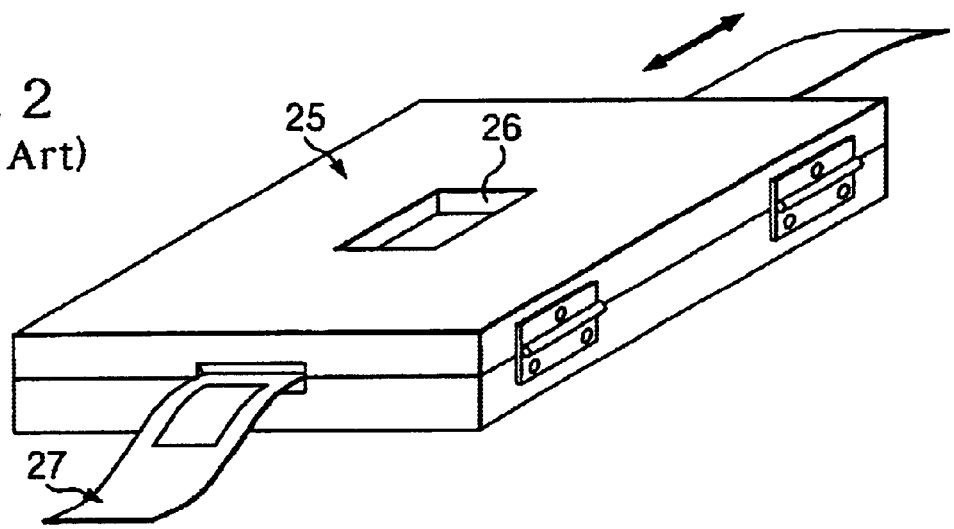
FIG. 2 is a perspective view of a film negative carrier used in the film scanner of FIG. 1.
Figure 3:
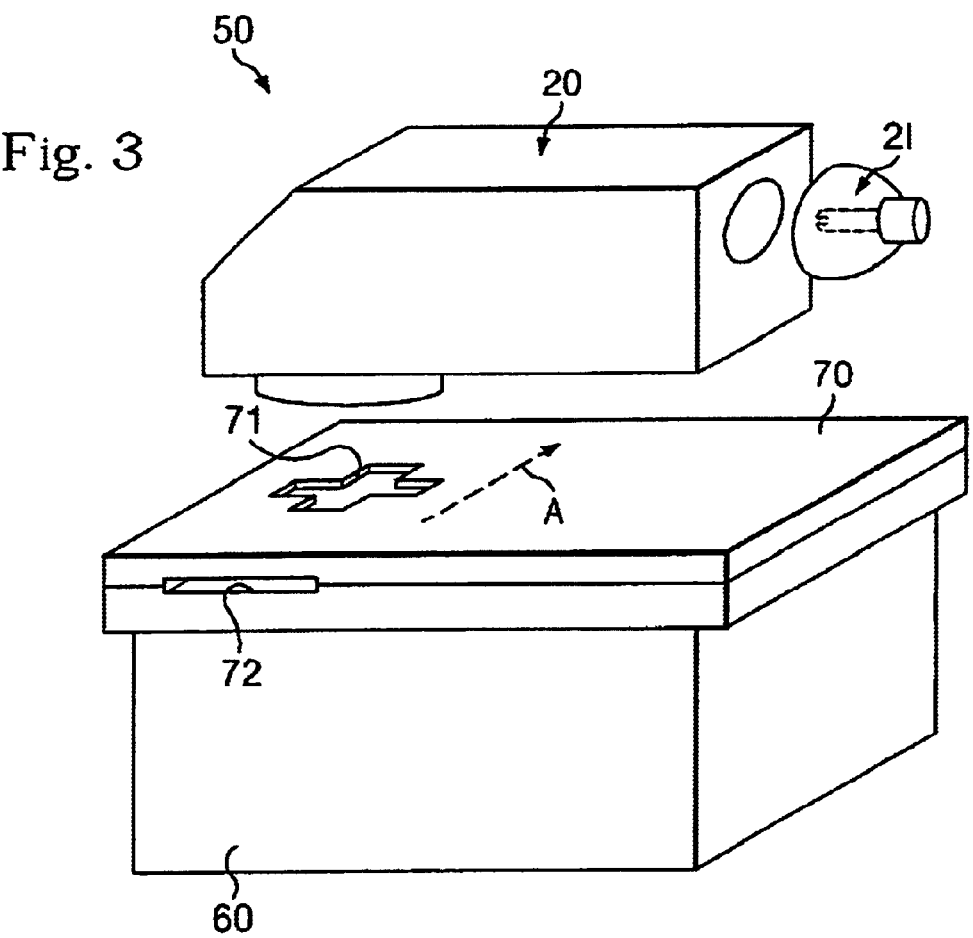
FIG. 3 is a brief perspective view showing an example of the film scanner of the present invention.

The embodiments of the present invention are described hereinafter with reference to the accompanying drawings. FIG. 3 is a perspective view of a scanner 50 of the present invention. The construction of the illumination unit and illumination lamp are identical to the construction of the conventional example shown in FIG. 1.

Figure 4:
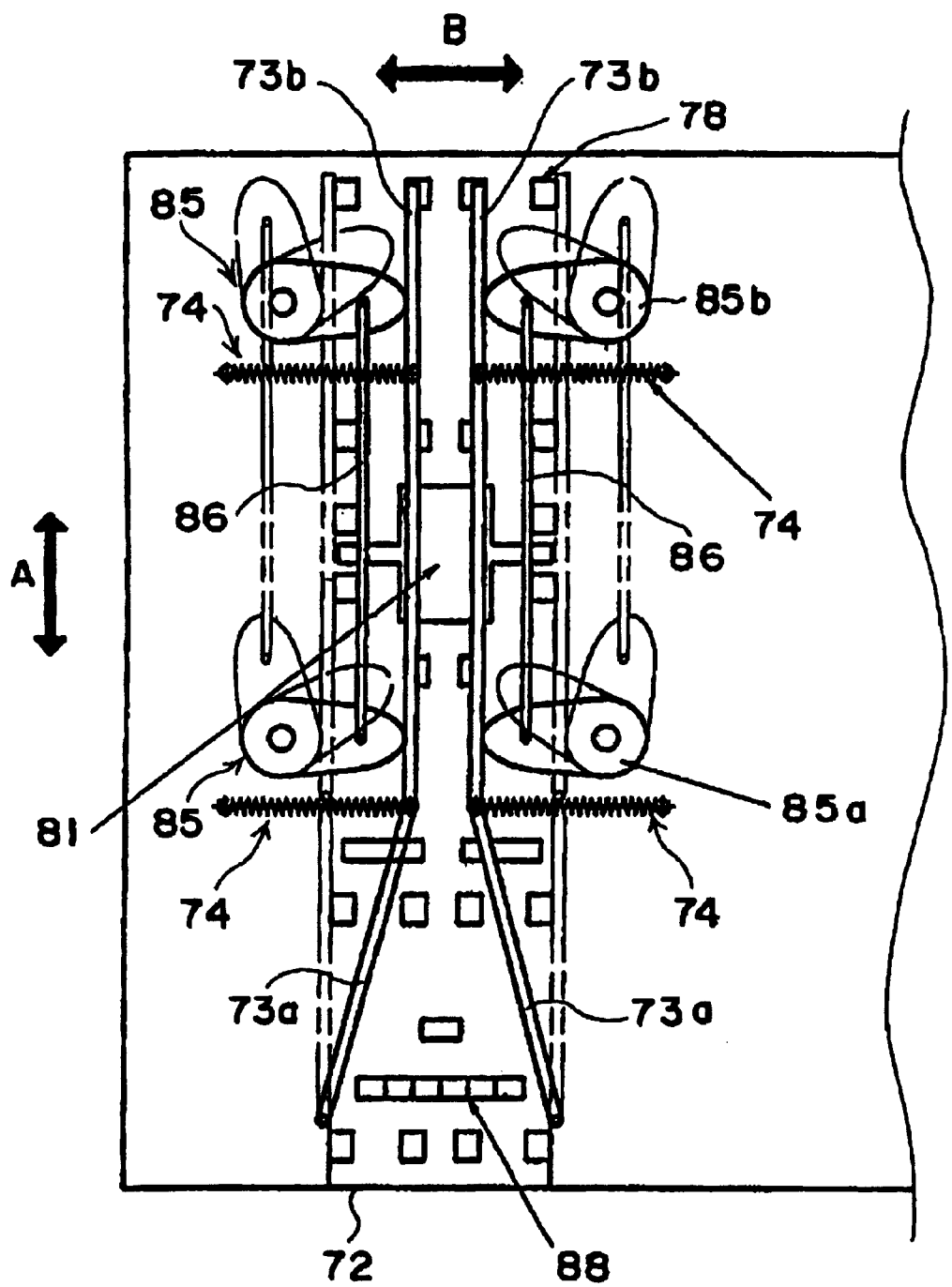
FIG. 4 is a horizontal cross section view of the carrier integratedly formed with the film scanner of FIG. 3.

A device body 60 is integratedly provided with a carrier 70 universally usable for film of a plurality of types. FIG. 4 is a horizontal cross section view showing the internal structure of the carrier 70 viewed from the top. An opening 81 shown in FIG. 4 is formed on the bottom surface of the carrier 70, and is positioned directly below the opening 71 shown in FIG. 3. Light emitted from an illumination lamp 21 is transmitted through an illumination unit 20, passes through opening 71 formed on the top surface of the carrier 70, film 27, and opening 81 formed on the bottom surface of the carrier 70, and moves within the device body 60. Within the device body 60 is provided a fixedly mounted linear CCD identical to the conventional example shown in FIG. 1, and image capture is accomplished by a mirror scanning method or a film scanning method.

Within the carrier 70, two guide bars 73 arranged opposite one another are provided. Each guide bar 73 comprises mutually flexible rod 73a and rod 73b. The guide bars 73b comprise a film transport path since the guide bars 73b move so as to change the spacing therebetween while maintaining mutually parallel. The guide bars 73a function as guide means for guiding film into the transport path. Furthermore, a plurality of pressure rollers 78 are arranged within the transport path to transport the film 27.

Each guide bar 73b is forced toward the outer side by a force applying means such as a spring 74 or the like. On the other hand, each guide bar 73b abuts two cams 85a and 85b connected by a linkage mechanism 8, such that the center position is normally maintained constant regardless of the transport width. According to this construction, the size of the device is restrained to a minimum limit in accordance with the film sizes of a plurality of types.

When film is inserted from a film insertion slot 72 of the carrier 70, the film size is detected by a sensor 88 disposed near the insertion slot. When the rotation position of the cam 85a is controlled by a control mechanism not shown in the drawing based on this detection value, the cam 85b connected by the linkage mechanism 86 is synchronously rotated in conjunction therewith. Since the guide bar 73a is pressed toward the cams 85a and 85b by the spring 74, both guide bars 73b are maintained in mutual parallel while the spacing is changed. In this way a transport path width can be automatically realized in accordance with the film size. At this time whether or not to use an opening having a mask can be selected as previously mentioned. When the film size is known beforehand, a construction may be used to change the transport path width a button operation by the operator.

An inserted film moves through the transport path stipulated by the guide bar 73b in the arrow A direction. This direction is the arrow A direction also shown in FIG. 3. The film insertion slot 72 has a size capable of receiving 60 mm Brownie film. Even when film wider than Brownie film is inserted, the film is guided by the guide bars 73a in a center direction, so as to ultimately advance to the transport path stipulated by the guide bars 73b. Thus, in the carrier of the present invention, a single insertion slot corresponds to a plurality of types of film sizes.

Figure 5:
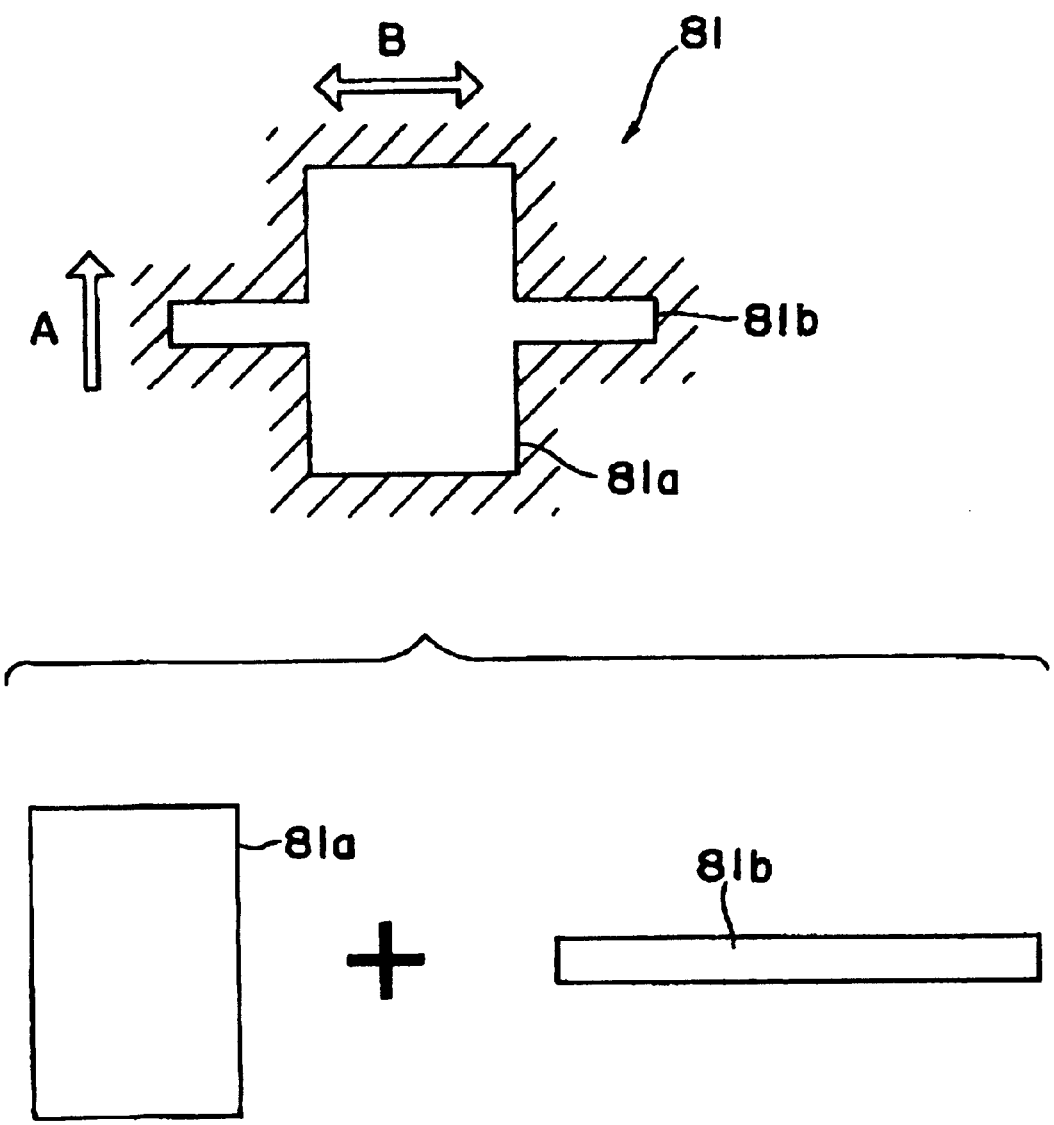
FIG. 5 is a plan view showing the opening formed on the bottom surface of the carrier of FIG. 4.

The opening 81 formed in the bottom surface of the carrier 70 is extracted and shown in FIG. 5. This opening comprises two combined quadrilaterals 81a and 81b. The quadrilateral 81a is a rectangle approaching a relatively square shape, and the quadrilateral 81b is a relatively narrow rectangle. The rectangle 81a corresponds to the largest frame sizes of films 135, 240, 126, 110, and has a breadth including all these frame sizes. On the other hand, the long edge of the rectangle 81b has a length corresponding to the width direction of Brownie film, and has a breadth corresponding to Brownie film. In this way the opening 81a has a multilateral shape including frame sizes of all film which might be expected to be used. In other words, the opening 81 has a multilateral shape including all openings and having masks 100 and 200 described later. Accordingly, when any of these films are used, the light transmitted through the film suitably arrives within the device body 60.

Figure 6:
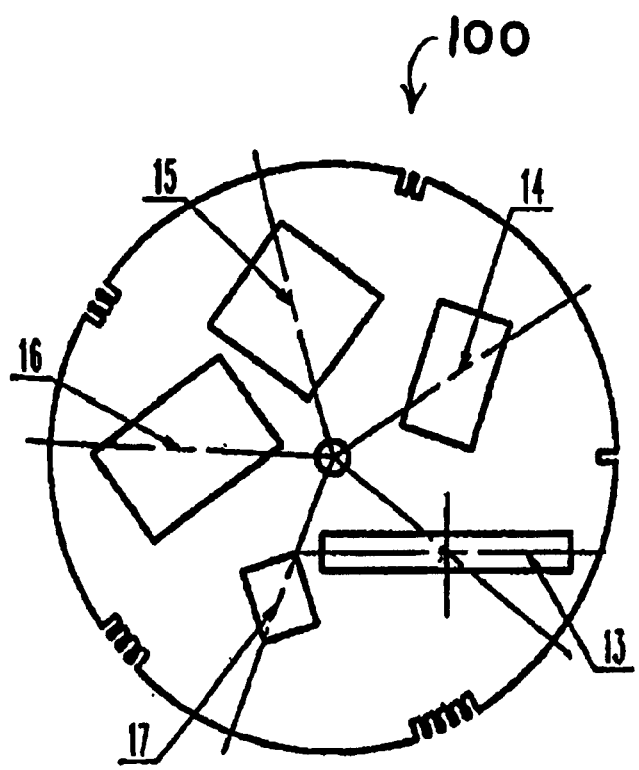
FIG. 6 is a plan view showing an example of a mask used in the film scanner of FIG. 3.
Figure 7:
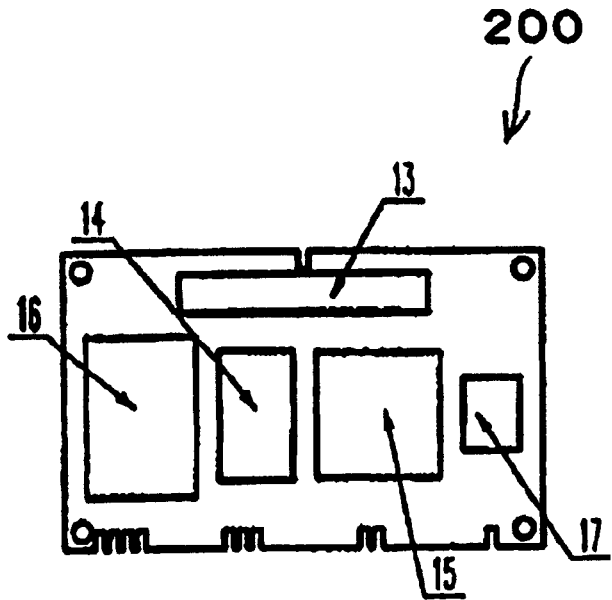
FIG. 7 is a plan view showing another example of a mask used in the film scanner of FIG. 3.

On the other hand, within the carrier 70, a mask corresponding to each film must be positioned above the previously mentioned linkage mechanism and directly below the top surface opening 71 (refer to FIG. 3). FIGS. 6 and 7 show examples of masks used for this purpose. The mask 100 shown in FIG. 6 is a turret rotating type mask, ands the mask 200 shown in FIG. 7 is parallel moving type. Both masks are respectively provided with a Brownie film opening 13, 240 film opening 14, 126 film opening 15, 135 film opening 16, and 110 film opening 17. An opening is suitably selected in accordance with the film size detected by the sensor 88, and desirable opening position is controlled to a suitable position by a well-known drive mechanism. This control is desirably accomplished simultaneously with the control of the transport path width described above.

In the film scanner of this construction, after the size of a film is detected relative to a plurality of types of film sizes, the transport path width is adjusted and a mask opening is selected, and thereafter the pressure rollers feed in the film. Then, after image top position detection, perforation detection, and DX code detection is accomplished by various types of sensors, the top frame is transported by the pressure roller to the scanning position. Thereafter, image data are captured using a normal mirror scanning method or film scanning method. In the case of Brownie film, since the shape of the opening 81 corresponds only to the width direction, and the opening 81 has a length corresponding to the frame size in the scanning direction, the scanning method is limited to the film scanning method.

Although a film scanner has been described in the aforesaid embodiments, the present invention is similarly effective for carriers loaded in an enlarger, a printer which print a recorded image on a printed sheet, and an image projector which project images.

Although preferred embodiments of the invention have been described in the foregoing detailed description and illustrated in the accompanying drawings, it will be understood that the invention is not limited to the embodiments disclosed, but is capable of numerous rearrangements, modifications and substitutions of parts and elements without departing from the spirit of the invention. Accordingly, the present invention is intended to encompass such rearrangements, modification and substitutions of parts and elements as fall within the spirit and scope of the invention.

What is claimed is:

1. A film carrier comprising:

a body having a film entrance opening;

a film size sensor disposed near the film entrance opening;

a transport path capable of changing a transport path width while maintaining a constant center position; and a controller for changing the transport path width in accordance with the film size detected by the film size sensor.

2. A film carrier according to claim 1, wherein the transport path provides two guide bars positioned in parallel, each guide bar is arranged in contact with a force applying member relative to a cam positioned on the outside of the transport path and connected by a link mechanism at equal spacing.

3. A film carrier according to claim 1 further comprising:

a mask provided with opening opposite the film in the transport path, wherein the opening is designed for use with various sizes of film; and the controller selects the mask opening in accordance with the film size detected by the film size sensor.

4. A film carrier according to claim 3, wherein the body provides an exit opening of the light transmitted through the mask having a multilateral shape to include all openings of the mask.

5. A film handling apparatus comprising:

a body having a film entrance opening;

a film size sensor disposed near the film entrance opening;

a transport path capable of changing a transport path width while maintaining a constant center position;

an illumination unit emitting light to the film positioned in the transport path; and a controller for changing the transport path width in accordance with the film size detected by the film size sensor.

6. A film handling apparatus according to claim 5, wherein the transport path provides two guide bars positioned in parallel, each guide bar is arranged in contact with a force applying member relative to a cam positioned on the outside of the transport path and connected by a link mechanism at equal spacing.

7. A film handling apparatus according to claim 5 further comprising:

a mask provided with an opening opposite the film in the transport path, wherein the opening is designed for use with various sizes of film; and the controller selects the mask opening in accordance with the film size detected by the film size sensor.

8. A film carrier according to claim 7, wherein the body provides an exit opening of the light transmitted through the mask having a multilateral shape to include all openings of the mask.

* * * * *